(12) United States Patent
Fidalgo Martins et al.

(10) Patent No.: US 11,549,860 B2
(45) Date of Patent: Jan. 10, 2023

(54) METHOD AND SYSTEM FOR INTERROGATING OPTICAL FIBERS

(71) Applicant: ARAGON PHOTONICS LABS S.L.U., Saragossa (ES)

(72) Inventors: Hugo Fidalgo Martins, Madrid (ES); Miguel Soriano Amat, Castellón (ES); María del Rosario Fernández Ruiz, Madrid (ES); Sonia Martín López, Madrid (ES); Miguel González Herráez, Madrid (ES); Javier Preciado Garbayo, Navarra (ES); Asier Villafranca Velasco, Navarra (ES)

(73) Assignee: ARAGON PHOTONICS LABS S.L.U., Saragossa (ES)

(*) Notice: Subject to any disclaimer, the term of this patent is extended or adjusted under 35 U.S.C. 154(b) by 0 days.

(21) Appl. No.: 17/325,529

(22) Filed: May 20, 2021

(65) Prior Publication Data

US 2021/0364385 A1 Nov. 25, 2021

(30) Foreign Application Priority Data

May 25, 2020 (EP) .................................. 20382439

(51) Int. Cl.
*G01M 11/00* (2006.01)
*G01J 3/26* (2006.01)
*G01J 3/44* (2006.01)

(52) U.S. Cl.
CPC .......... *G01M 11/3136* (2013.01); *G01J 3/26* (2013.01); *G01J 3/44* (2013.01)

(58) Field of Classification Search
CPC .......... G01M 11/3136; G01J 3/26; G01J 3/44

USPC ........................................................ 356/451
See application file for complete search history.

(56) References Cited

U.S. PATENT DOCUMENTS

| 2007/0087445 A1* | 4/2007 | Tearney | G01N 21/6408 |
| | | | 436/172 |
| 2010/0254415 A1* | 10/2010 | Oh | H01S 3/08009 |
| | | | 250/493.1 |
| 2019/0094049 A1* | 3/2019 | Iwamura | G01D 5/35335 |

FOREIGN PATENT DOCUMENTS

| CN | 102576971 A | * | 7/2012 | ................ G01J 3/10 |
| CN | 108594478 A | * | 9/2018 | |
| JP | 2020051941 A | * | 4/2020 | |

\* cited by examiner

*Primary Examiner* — Tarifur R Chowdhury
*Assistant Examiner* — Omar H Nixon
(74) *Attorney, Agent, or Firm* — Cantor Colburn LLP

(57) ABSTRACT

A method and a system for interrogating an optical fiber includes a probe signal that has a first frequency comb at a first repetition rate ($\Delta f$) injected into the optical fiber. A backscattering signal that includes the probe signal convolved with an impulse response of the optical fiber in reflection which is sensitive to at least one parameter being measured from the optical fiber is gathered. The backscattering signal is beaten with a local oscillator signal to generate a beating signal, the local oscillator signal including a second frequency comb at a second repetition rate that is offset from the first repetition rate ($\Delta f + \delta f$) and being mutually coherent with the first frequency comb. The resulting beating signal is analysed to thereby determine the at least one parameter being measured from the optical fiber.

15 Claims, 6 Drawing Sheets

METHOD AND SYSTEM FOR INTERROGATING OPTICAL FIBERS

CROSS-REFERENCE TO RELATED APPLICATIONS

This application claims priority to European Patent Application No. 20382439.6, filed on May 25, 2020, the contents of which are hereby incorporated by reference in their entirety.

TECHNICAL FIELD

In general, the present disclosure relates to optical sensing that makes use of optical comb spectroscopy techniques. More particularly, the present disclosure refers to a method and system for interrogating optical fibers, for example, sensing optical fibers, that makes use of dual-comb spectroscopy techniques.

BACKGROUND

In distributed fiber optic sensing, fiber optic waveguides are generally used as sensors. In the last few years, distributed sensors based on backscattering processes have become a prominent sensing tool for a wide number of applications, such as the monitoring of perimeters for safety purposes, the detection of events like earthquakes or ocean gravity waves, or the monitoring of structural health in different infrastructures, among many others. These systems based on distributed fiber optic sensors can replace configurations based on arrays of hundreds or thousands of point sensors, reducing the complexity and the installation and maintenance cost of the systems, since the sensing and the data transmission are carried out on a single optical fiber cable.

In such systems, it is desirable to spatially divide the fiber optic waveguide, which may range from a few meters to many kilometres long, into discrete sensing regions so that the optical fiber is transformed into a dense array of sensors. These sensors are not placed in or attached to the fiber, but instead are created by the way the optical fiber is interrogated. Ideally, the dense array of sensors will have spacing between the sensors down to the level of a few meters, a few centimetres or even less, so as to achieve a very fine spatial resolution.

There are many ways to interrogate a distributed fiber optic sensor, but all of these interrogation methods require sending optical energy into the optical fiber to produce a backscattered light signal which is analysed to extract spatially-resolved measurements of physical or chemical properties in proximity to the fiber, such as, temperature, vibration, static or dynamic strain, chemical concentration or pressure, among others. The backscatter signal generated may include one or a combination of Rayleigh, Brillouin, or Raman backscatterings.

In order to be able to use the backscatter signal as an array of sensors spaced closely along the optical fiber, a method of multiplexing, or dividing up the backscatter response generated in the optical fiber can be used. To do so, the interrogation of the optical fiber can be performed either in frequency or in time domain, by application of Frequency-Domain (OFDR, Optical Frequency Domain Reflectometry) or Time-Domain (OTDR, Optical Time Domain Reflectometry) techniques. These two techniques allow interrogating optical fibers of different lengths with a range of spatial resolutions, i.e., from hundreds of meters with millimetre resolution (using OFDR technique) to >100 km with resolutions of meters or tens of meters (using OTDR technique).

Phase-sensitive OTDR (($\varphi$)OTDR) is a coherent time-domain sensing technique that is normally used for performing distributed strain and temperature sensing. In ($\varphi$)OTDR, the propagation of a short probe pulse along an optical Fiber-Under-Test (FUT) generates a backscatter signal, which provides information about each position along the fiber through Time-of-Flight (ToF) measurements. The spatial resolution of the ($\varphi$)OTDR technique scales with the employed pulse width, being typically 1 meter per 10 ns of pulse duration.

Thus, for attaining high-resolution measurements, the use of short pulse interrogation signals with high bandwidths is compulsory, and accordingly, high-frequency electronics in photo-detection (hundreds of MHz or GHz) are required. As the resolution is increased, the bandwidth required is increased in the same amount and the noise performance of the receivers is degraded, thereby adversely affecting the integrity of the sensed parameters. Moreover, this also implies significant challenges in the data acquisition, storage and processing requirements of the developed systems, and also significant costs in the developed solutions. These are all clear drawbacks of typical phase-sensitive OTDR systems.

Therefore, there is still a need in the state of the art of ($\varphi$)OTDR-based methods and systems for interrogating optical fibers which are able to overcome, or to at least significantly mitigate, the above cited drawbacks.

SUMMARY

The present disclosure refers to a novel ($\varphi$)OTDR-based method and system that makes use of dual-frequency comb technology to implement the interrogation process of at least one optical fiber under test.

Optical frequency combs (OFCs) are used in many applications such as optical clocks, precision frequency/time transfer, low phase noise microwave generation, astronomical spectrograph calibration, molecular spectroscopy, coherent LIDAR, and arbitrary optical/RF waveform generation, among others. As used herein, an "optical frequency comb" may refer to an optical signal whose spectrum comprises a series of discrete, equally spaced frequency lines. Frequency combs can be generated by a number of mechanisms, e.g., periodic modulation (in amplitude and/or phase) of a continuous-wave laser, four-wave mixing in nonlinear media, or stabilization of the pulse train generated by a mode-locked laser. The main advantage of OFCs arises from the fact that thousands of highly coherent optical frequencies can be accurately and precisely defined with only two degrees of freedom, namely, the Carrier-Envelope-Offset frequency (CEO frequency) and the comb frequency spacing (or repetition rate).

In Dual-Comb Spectroscopy (DCS), two broadband, mutually coherent OFCs (at least during the time of measurement) working at the same centre frequency but having a slight difference in repetition rates (frequency offset) are used. The interference of the two OFCs with slightly different line spacing enables the acquisition of high-resolution spectra with one single photodetector (per polarization axis) and low-bandwidth electronics, thanks to an optical-to-radiofrequency (RF) down-conversion. DCS exploits the frequency resolution, frequency accuracy, broad bandwidth, and brightness of frequency combs for ultrahigh-resolution, high-sensitivity broadband spectroscopy. By using two coherent frequency combs, DCS allows a sample's spectral response to be measured on a comb tooth-by-tooth basis rapidly and without the constraints of conventional high frequency and high bandwidth spectrometers.

A first object of the disclosure is a method for interrogating an optical fiber, for example, a sensing optical fiber. As used herein, a sensing optical fiber may refer to an optical fiber that is used as a sensor to, periodically or on an ad hoc basis, measure a physical or chemical property inside or in proximity to the fiber, such as, temperature, vibration, static or dynamic strain, chemical concentration of compounds, pressure, etc. Alternatively, the optical fiber may not refer to a sensing optical fiber. In other words, the optical fiber may not refer to an optical fiber that is configured to monitor (periodically or on an ad hoc basis) a physical or chemical parameter, but to an optical fiber (e.g., a communication optical fiber, transmission optical fiber, etc.) from which a parameter, e.g., its length, refractive index or birefringence, among others, is to be measured either occasionally, periodically or on an ad hoc basis. The optical fiber may be any kind of optical fiber made of silica, fluoride glasses, phosphate glasses, chalcogenide glasses, crystalline materials, etc. The optical fiber may be also a multimode fiber, a single-mode fiber, or a special purpose fiber, among many others.

The method comprises injecting a probe signal into the optical fiber, the probe signal comprising a first optical frequency comb at a first repetition rate ($\Delta f$). For example, this first optical frequency comb may have a repetition rate (line spacing between frequency adjacent spectral lines) of about 1 MHz, although any other repetition rate may be used. The bandwidth ($N \cdot \Delta f$) of the probe signal will depend on the number of lines (N) in the comb and its repetition rate ($\Delta f$).

The method further comprises gathering a backscattering signal from the optical fiber, said backscattering signal being generated by the optical fiber due to a backscattering process (e.g., Rayleigh, Raman or Brillouin) and in response to the injection of the probe signal. The backscattering signal is the input probe signal convolved with the impulse response of the optical fiber in reflection, the said impulse response of the fiber being locally sensitive to the at least one parameter being measured. In the frequency domain, the received backscattering signal possesses a comb-like spectrum with the same number of lines (N) and the same repetition rate ($\Delta f$) than the probe signal, each line being modulated in amplitude and phase by the spectral response of the fiber in reflection at each comb line frequency to the at least one parameter being measured.

The parameters being measured or sensed by the optical fiber might be temperature, length of the fiber, pressure, vibrations, strain, the presence and/or amount of a particular chemical compound, etc. Generally speaking, the parameters that can be measured or sensed inside or in the vicinity of the optical fiber may be any physical or chemical parameter that provokes a change in the impulse response of the optical fiber. In other words, they may be any physical or chemical parameter that generates a measurable change in the backscattering signal generated inside the optical fiber.

The received backscattering signal is beaten (in photodetection) with a local oscillator signal to generate a beating signal. The local oscillator signal comprises a second optical frequency comb, mutually coherent with the first comb, at a second repetition rate that is offset from the first repetition rate ($\Delta f + \delta f$). Preferably, the repetition rate offset ($\delta f$) between the first and second comb will be constant (so as to have a constantly increasing separation between adjacent pairs of lines in the two combs), but it may also be chosen to vary constantly or variably across the optical frequency comb lines. As used herein, the term "beating" may refer to obtaining the squared modulus of the sum of the two signals. For the particular case of "beating two optical frequency combs" the resulting beating signal will include a plurality of beating terms, among which the lower frequency terms will include spectral lines corresponding to the squared modulus of the sum of every two adjacent spectral lines of the two optical frequency combs. This lower-frequency comb (generated from the interference of the adjacent lines of the two combs) may be selected by either a physical or a digital low pass filter (before or after digitization, respectively). Thus, the beating signal comprises an optical frequency comb in the Radio Frequency (RF) range that is basically a spectrally compressed version of the backscattering signal. In this way, the bandwidth of the detected comb (the lower-frequency RF comb from the beating signal) is compressed in relation to the probe comb by a factor $\Delta f/\delta f$ (which we will herein refer as "compression factor"). This process will herein be referred to as "down-conversion". The backscattering signal and the local oscillator signal may be beaten in a photodetector, preferably in a balanced photodetector.

Then, the beating signal is analysed to thereby determine the at least one parameter being monitored by the optical fiber. Thanks to the down-conversion process described above, the backscattering signal is mapped onto the RF domain (the RF domain being a range that ranges from 0 to around 300 GHz), allowing its detection and analysis with RF electronics, e.g., oscilloscopes or digitizers. The frequency down-conversion of the original optical signals is due to the beating of the backscattering signal and the local oscillator signal. By down-converting the backscattering signal to the RF domain, the impulse response of the optical fiber in reflection can be obtained, provided that the properties of the input probe comb and the local oscillator comb are known or controlled.

It should also be noted that the frequency down-conversion of the backscattering signal is equivalent to a time-domain expansion in ($\varphi$)OTDR of the backscattering signal. In other words, with respect to a conventional ($\varphi$)OTDR, the temporal backscattering trace of the fiber is expanded by the spectral compression factor, i.e., by a factor $\Delta f/\delta f$. In general, this implies a substantial advantage compared to conventional ($\varphi$)OTDR systems, since in this case the photodetector and digitizing electronics can be of much lower bandwidth. As used herein, the term "trace" refers to the part of the beating signal that carries relevant information relative to the at least one parameter being measured into the optical fiber being under test.

Generally speaking, if I(f) is the input probe signal spectrum (the Fourier transform of the input optical field) and O(f) is the backscattering signal spectrum (the Fourier transform of the measured backscattered optical field), the frequency response of the fiber can be calculated as H(f)=O(f)/I(f). Then from H(f), it is possible to compute (through inverse Fourier transform) the temporal impulse response of the fiber in reflection, which is the quantity of interest to determine (in a spatially-resolved manner) the at least one parameter being sensed. Interestingly, the temporal impulse response of the fiber can be obtained directly in the RF electronics if the relative amplitudes and spectral phases of the corresponding lines of the input probe comb and the local oscillator comb are the same. In other words, in the case when the adjacent lines of the input probe comb and local oscillator comb have the same relative amplitudes and spectral phases, there is no need for further processing the beating signal after detection (i.e. the impulse response of the fiber appears directly in the low-frequency range of the photo-detected signal). In those conditions, the phase of the temporal impulse response of the fiber provides the necessary information to retrieve the measured quantity of interest (temperature, strain, chemical concentration, birefringence, etc.).

In some embodiments, when the relative amplitude and/or the spectral phase of the probe and the local oscillator signals are different, the impulse response of the optical fiber to the at least one parameter of interest is obtained by computing the ratio between the Fourier transform of the beating comb and the multiplication of the Fourier transforms of the input probe signal and the conjugate of the local oscillator signal. Prior to calculating the multiplication of the Fourier transforms of the input probe signal and the conjugate of the local oscillator signal, said input probe and local oscillator signals are down-converted to have a repetition rate that corresponds to the offset ($\delta f$) of the local oscillator signal.

In some embodiments, the first optical frequency comb and the second optical frequency comb have constant amplitude. Preferably, the first optical frequency comb and the second optical frequency comb have a common constant amplitude.

In some embodiments, when the first optical frequency comb and the second optical frequency comb have a common relative amplitude and a common spectral phase, the impulse response of the optical fiber to the parameter of interest can be directly obtained from the beating signal in detection by RF electronics (avoiding additional processing steps of the beating signal).

In some embodiments, the first optical frequency comb and the second optical frequency comb have a common or a different random spectral phase. By having the first optical frequency comb and the second optical frequency comb a random spectral phase, the formation of high peak power pulses is avoided. Thus, more energy can be sent in the probe signal through the optical fiber without generating nonlinearities, since the probe signal sent to the optical fiber appears as noise with a homogeneous energy along the time. Compared to the use of other signals with a fixed phase relationship among the lines of the comb, this strategy allows to improve the signal to noise ratio of the measurements. In addition, if both combs have the same random spectral phase and constant amplitude across the adjacent lines, as mentioned before, the temporal impulse response of the fiber can be directly retrieved at the output of the photodetector.

In some embodiments, the step of analysing the beating signal comprises acquiring the beating signal after photodetection, processing it so as to determine the impulse frequency response of the optical fiber and determining from this impulse response the at least one parameter being measured by the optical fiber. The beating signal might be digitized using some kind of digitizing electronics. From the digitized signal, obtaining the impulse response of the fiber in reflection may or may not require an additional processing step, depending on the phase and amplitude arrangements of the probe and local oscillator combs. To determine the at least one parameter being measured, the phase of the impulse response of the fiber in reflection may be used.

In some embodiments, the method comprises generating, by a first optical frequency comb generator, the probe signal. The first optical frequency comb generator is configured to receive an input signal from a source, e.g., a laser source, and to output the first frequency comb.

In some embodiments, the method comprises generating, by a second optical frequency comb generator, the local oscillator signal. The second optical frequency comb generator is configured to receive the input signal from a source, e.g., the same laser source used for generating the probe signal or a different laser source but centred on the same frequency, and to output the second frequency comb.

In some embodiments, prior to beating the backscattering signal with the local oscillator signal, the method comprises combining the backscattering signal and the local oscillator signal to generate a dual frequency comb signal. The combination of the backscattering signal and the local oscillator signal may be carried out by an optical coupler that receives both signals and whose output is optically connected to a photodetector where the beating step of the method is performed. By coupling both signals before being beaten, the processing of the coupled signal and the mounting of the system is simplified.

A second object of the disclosure is a system for interrogating an optical fiber, for example, a sensing optical fiber, a transmission optical fiber, a communication optical fiber or any other type of optical fiber.

The system comprises the optical fiber that is configured to receive a probe signal. The probe signal comprises a first optical frequency comb at a first repetition rate ($\Delta f$). The optical fiber is further configured to generate a backscattering signal in response to the injection of the probe signal. The backscattering signal comprises the probe signal convolved with the impulse response of the optical fiber in reflection, which is sensitive to at least one parameter being measured (parameter of interest).

The system further comprises a photodetector that is configured to beat the backscattering signal received from the optical fiber with a local oscillator signal. The local oscillator signal comprises a second optical frequency comb at a second repetition rate that is offset from the first repetition rate ($\Delta f + \delta f$) and is mutually coherent with the first optical frequency comb. Preferably, the repetition rate offset ($\delta f$) between the first and second comb will be constant, but it may also be chosen to vary constantly or variably across the optical frequency comb lines. Preferably, the photodetector may be a balanced photodetector. The balanced photodetector is able to cancel the non-interferential part of the beating signal so the dynamic range of the beating signal can be better exploited in detection.

The system also comprises an analysis module configured to determine the at least one parameter being measured by the optical fiber from the beating signal received in the photodetector. By down-converting the backscattering signal to the RF domain, the impulse response of the optical fiber in reflection can be obtained, provided that the properties of the input probe comb and local oscillator comb are known or controlled. In particular, the analysis module is able to compute the impulse response of the fiber in reflection and, from its phase, the parameter being measured. The analysis module may comprise an acquisition unit and a digitalization unit to acquire and digitize the beating signal prior to compute the impulse response of the fiber in reflection.

In some embodiments, the analysis module may comprise a physical or digital low pass filter for filtering the lower frequency beating terms of the signal. This filtering may lead, in the cases in which the two combs have the same relative amplitudes and phases in adjacent lines across the spectrum, to a direct determination of the impulse response of the optical fiber in reflection, and therefore a simpler and more rapid determination of the parameter of interest.

In some embodiments, in the cases in which the probe and local oscillator combs have different relative amplitudes and/or spectral phases, the analysis module is further configured to obtain the impulse response of the fiber in reflection from the ratio between the Fourier transform of the beating comb and the multiplication of the Fourier transforms of the input probe signal and the conjugate of the local oscillator signal (after digitally down-converting the probe and the local oscillator combs to have a repetition rate of δf).

In some embodiments, the first frequency comb and the second frequency comb have a same random spectral phase or a different random spectral phase. By having a random phase, it is possible to increase the energy injected into the optical fiber without inducing nonlinear effects, significantly increasing the signal-noise ratio (SNR) of the optical fiber.

In some embodiments, the system further comprises a dual frequency comb generation system to generate the first optical frequency comb and the second optical frequency comb.

In some other embodiments, the dual frequency comb generation system comprises a first optical frequency comb generator configured to receive an input signal from a source and to output the first optical frequency comb, and a second optical frequency comb generator configured to receive an input signal from a source and to output the second optical frequency comb. The first optical frequency comb generator may be optically coupled to the optical fiber (fiber under test) by means of an optical circulator such that the probe signal generated by the first optical frequency comb generator is injected into the optical fiber by interposition of the optical circulator and the backscattering signal is directed towards the photodetector by means of the optical circulator too.

The optical circulator may be directly and optically coupled to the photodetector or may be optically coupled to the photodetector by interposition of an optical coupler. The second optical frequency comb generator may be directly and optically coupled to the photodetector or may be coupled to the photodetector by interposition of the same optical coupler. This optical coupler, that is an optional device, may couple the backscattering signal and the local oscillator signal prior to reach the photodetector in order to simplify the beating operation and the design of the system.

In some embodiments, the first optical frequency comb generator is a first Mach-Zehnder Modulator (MZM) driven by a first Arbitrary Waveform Generator (AWG) and the second optical frequency comb generator is a second Mach-Zehnder modulator driven by a second arbitrary waveform generator (AWG). For example, the first AWG and the second AWG may be the same AWG or may be different and synchronized AWGs. Alternatively, the optical frequency comb generators may be a Direct Digital Synthesizer (DDS), an RF generator with an electronic comb generator, or similar, to generate the respective optical frequency combs.

In some embodiments, each optical frequency comb generator comprises a respective amplifier, preferably an Erbium-Doped Fiber Amplifier (EDFA), optically connected at the output of the first optical frequency comb generator and of the second optical frequency comb generator, respectively. By amplifying the optical frequency combs, the SNR is improved.

In some embodiments, the optical frequency combs comprise a filter, preferably an optical bandpass filter (tunable or not), optically connected at the output of the amplifier of the first optical frequency comb generator and of the second optical frequency comb generator, respectively. These filters are centred on the same frequency than the first and second optical frequency combs, and have a bandwidth that substantially corresponds to the bandwidth of the first and second optical frequency combs.

In some embodiments, the source is a continuous-wave laser, e.g. a low phase noise single-frequency semiconductor laser, a low phase noise single-frequency fiber laser, or others. Alternatively, the source may be pulsed lasers such as mode-locked lasers.

The method and system for interrogating optical fibers herein described present several advantages and/or differences compared with previous devices and techniques. In particular, it is provided a novel method and system to induce a time-domain expansion in (φ)OTDR. The method interrogates the optical fiber under test using dual frequency comb technology. This enables to probe the optical fiber using a broad bandwidth optical signal (probe signal), leading to high spatial resolution, but relaxing the detection and acquisition requirements extraordinarily. In particular, the frequency down-conversion (equivalent to time expansion) of the optical signals to the radio-frequency (RF) domain allows the detection of the resulting signal with relatively low-bandwidth electronics. Besides, both the probing and reference (local oscillator) combs may be spectrally phase coded using an identical code sequence. Using this method, the formation of high peak power temporal pulses is avoided, spreading the launched power along the temporal period, while automatically decoding the traces at detection. Therefore, it is possible to increase the energy injected into the optical fiber without inducing nonlinear effects, significantly increasing the SNR of the received signal.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out.

The drawings comprise the following figures.

DETAILED DESCRIPTION OF THE DRAWINGS

Figure 1:
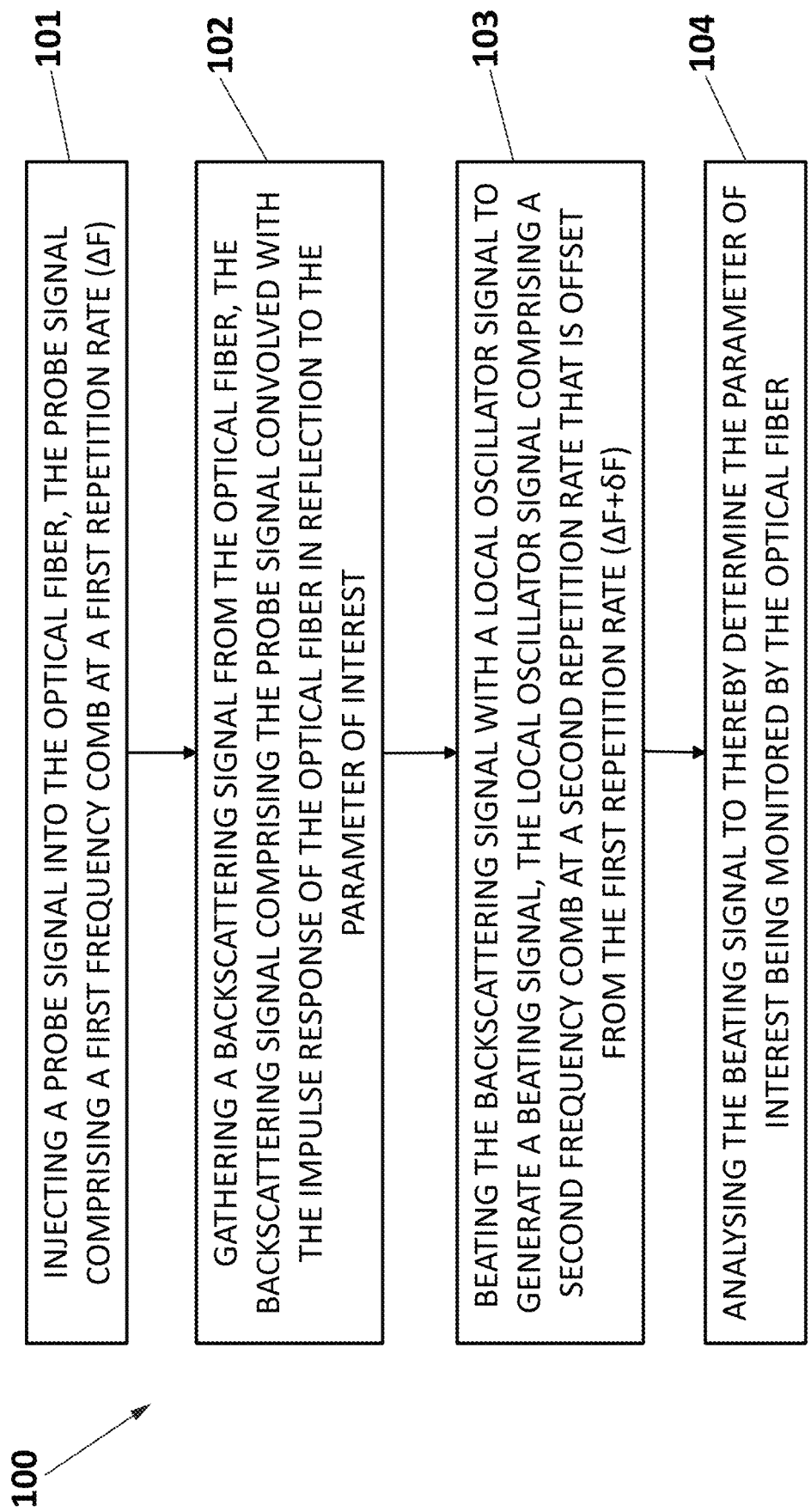
FIG. 1 shows a flow diagram of the method for interrogating an optical fiber, according to a particular embodiment of the disclosure.

FIG. 1 shows a flow diagram of the method 100 for interrogating an optical fiber, according to an embodiment of the disclosure. The optical fiber may be a sensing, transmission or communication optical fiber, among other types of optical fibers. The optical fiber is interrogated to measure at least one parameter of interest. The parameter of interest may be temperature, vibration, static or dynamic strain, chemical concentration of compounds, pressure, the length of the fiber, refractive index, etc. Besides, the interrogation of the optical fiber may be performed in a continuous, periodical, occasional or on an ad hoc basis.

At step 101 of the method 100, a probe signal is injected into the optical fiber. This probe signal comprises a first optical frequency comb at a first repetition rate ($\Delta f$). For example, this first optical frequency comb may have a repetition rate of about 1 MHz. The probe signal may further have a bandwidth of 5 GHz such that the probe signal is formed by 5000 frequency lines with a frequency spacing of 1 MHz between each two adjacent frequency lines.

At step 102 of the method 100, a backscattering signal is gathered from the optical fiber. The backscattering signal is generated by the optical fiber in response to the injection of the probe signal and comprises the probe signal convolved with the impulse response of the optical fiber in reflection to the parameter of interest. For example, the backscattering signal may comprise the probe signal convolved with the impulse response of the optical fiber in reflection to the strain to which is subjected the optical fiber. That is to say, the optical fiber may be attached to a deformable surface such that any change in said surface may generate a particular strain in certain portions of the optical fiber, which, in turn, may change the impulse response of the optical fiber in reflection to the strain in that portion of the optical fiber. Therefore, any strain applied to the optical fiber may modify its impulse response in reflection in the portion of the optical fiber on which the strain is applied.

At step 103 of the method 100, the gathered backscattering signal is beaten with a local oscillator signal to generate a beating signal. The local oscillator signal comprises a mutually coherent second frequency comb with similar bandwidth and the same number of lines than the first comb, and having a second repetition rate that is offset from the first repetition rate ($\Delta f+\delta f$). Preferably, the repetition rate offset ($\delta f$) between the first and second comb will be constant but it may also be chosen to vary constantly or variably across the optical frequency comb lines. In such embodiment, the offset ($\delta f$) may be 80 Hz, although any other suitable offset value may be used. The resulting beating signal is a down-converted optical frequency comb centred in the Radio Frequency (RF) spectrum.

At step 104 of the method 100, the beating signal is analysed to thereby determine the at least one parameter of interest being monitored by the optical fiber. The backscattering signal is down-converted to the RF domain (the RF domain being a frequency range from 0 kHz to around 300 GHz) allowing its detection and analysis with RF electronics. The frequency down-conversion of the backscattering signal performed in a photodetector allows retrieving the impulse response of the optical fiber in reflection to the parameter of interest, provided that the properties of the input probe comb and local oscillator comb are known or controlled.

The frequency down-conversion of the probe signal and the local oscillator signal implies a time-domain expansion in ($\varphi$)OTDR of the probe signal and the local oscillator signal.

Figure 2:
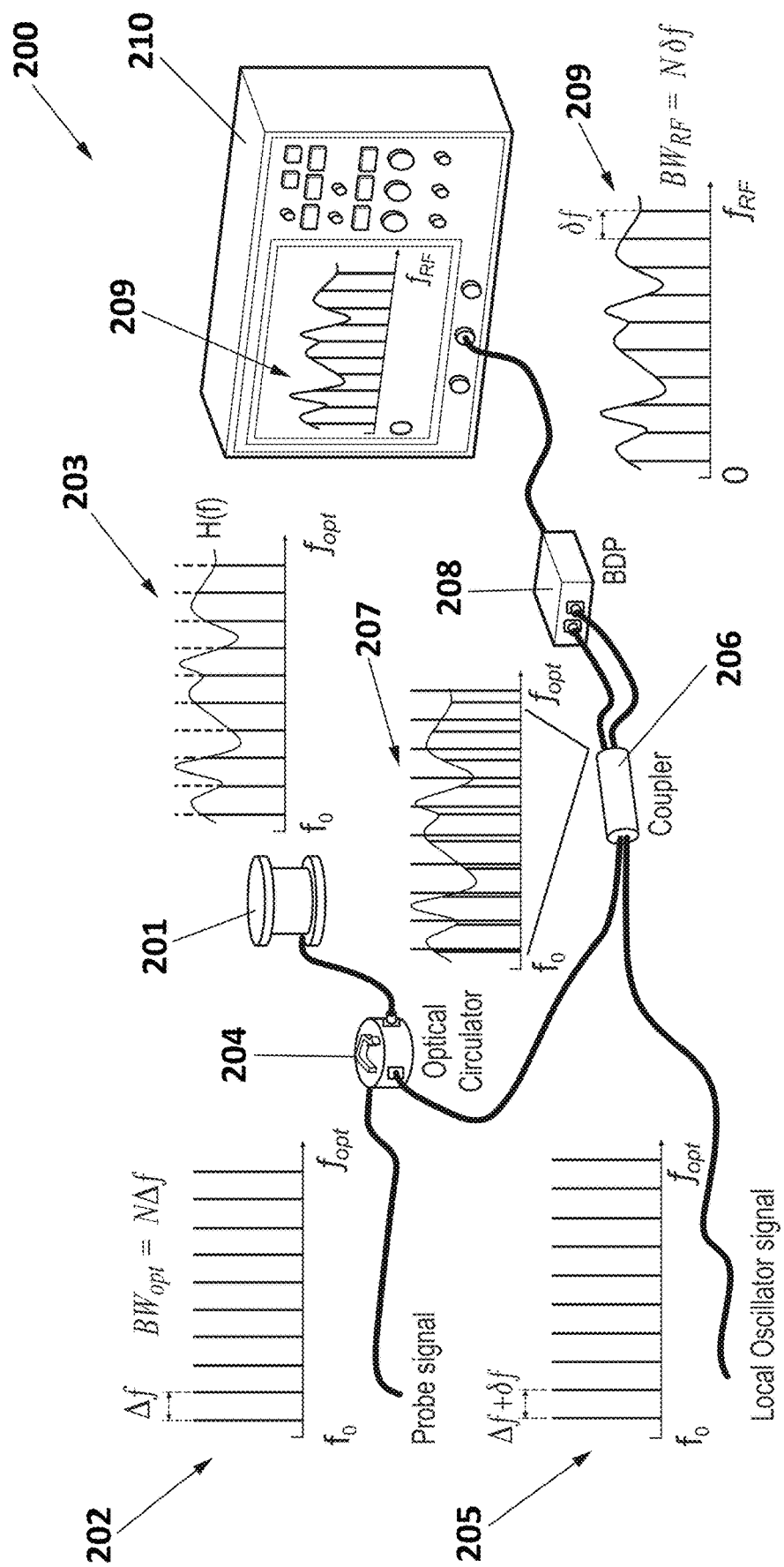
FIG. 2 shows a system for interrogating an optical fiber, according to a particular embodiment of the disclosure.

FIG. 2 shows a system 200 for interrogating an optical fiber 201 under test, according to a particular embodiment of the disclosure. It should be understood that the system of FIG. 2 may include additional components and that some of the components described herein may be removed and/or modified without departing from a scope of the described system 200. Additionally, implementation of the system 200 is not limited to such embodiment.

A probe signal 202, in particular, a first frequency comb with the suitable bandwidth ($BW_{opt}=5$ GHz) for the desired spatial resolution of the measures obtained, a line spacing or repetition rate ($\Delta f=1$ MHz) and centred on a frequency ($f_c$, wherein $f_c=f_0+f_{ini}+\Delta f \cdot N/2$, with "$f_0$" being the emission frequency of the source generating the first frequency comb and "$f_{ini}$" being the frequency range between "$f_0$" and the first line of the first frequency comb), is sent to the optical fiber 201. For example, "$f_c$" might be 193.55 THz. Therefore, the probe signal 202 is formed by a set of 5000 (N) frequency lines having a constant frequency spacing of 1 MHz between each two adjacent lines. Upon backscattering, a backscattering signal 203 is generated into the optical fiber. Said backscattering signal 203 corresponds to the first frequency comb 202 convolved with the impulse frequency response (h(t), being the inverse Fourier transform of H(f)) of the optical fiber 201 in reflection to the parameter of interest, for example, the temperature of the optical fiber 201. Thus, the backscattering signal 203 has the same bandwidth ($BW_{opt}$), line spacing ($\Delta f$) and is centred in the same frequency ($f_c$) than the probe signal 202, but with frequency lines having a different amplitude and phase that will depend on the mentioned impulse frequency response (H(f)). Therefore, the spectral response (H(f)) (or the impulse response (h(t))) of the optical fiber 201 to the parameter of interest is encoded in the amplitude and phase of the frequency lines of the optical frequency comb of the backscattering signal 203.

The probe signal 202 is sent to the optical fiber 201 by interposition of an optical circulator 204 that also receives the backscattering signal 203 and directs it towards the photodetector 205, e.g., a balanced photodetector. The optical circulator 204 ensures that all the power received from the probe signal 202 is directed towards the optical fiber 201 and that all the power received form the backscattering signal 203 is directed towards the photodetector 205.

The backscattering signal 203 and a local oscillator signal 205 are combined by an optical coupler 206 (combiner) to generate a coupled signal 207 (dual-frequency comb). The local oscillator signal 205 is a second frequency comb with a similar bandwidth ($BW_{opt}$), centred around the same frequency ($f_{c'}$, wherein $f_{c'}=f_0+f_{ini}+(\Delta f+\delta f) \cdot N/2$) and with the same number (N) of frequency lines than the first frequency comb 202. However, the local oscillator signal 205 has a slightly different line spacing ($\Delta f+\delta f$) than the line spacing of the probe signal 202. In particular, the second frequency comb is offset from the first frequency comb. The offset is 80 Hz ($\delta f$).

The frequency compression process is achieved by beating, at the photodetector 208, the backscattering signal 203 with the local oscillator signal 205 to generate a beating signal 209. The beating between neighbouring pairs of lines (one of the lines of each pair corresponding to the backscattering signal 203 and the other to the local oscillator signal 205) in detection leads to a spectral compression of the backscattered spectrum. In this embodiment, the same random spectral phase is applied to both combs 202,205, avoiding the formation of high peak power pulses. This allows sending more energy to the optical fiber 201 without nonlinearities, since the probe signal 202 appears as a noise-like signal with homogeneous energy along the time. In this particular embodiment (combs with $BW_{opt}=5$ GHz and $N=5000$), the application of a common random spectral phase in the two combs leads to an injected energy increase of around 27 dB. In addition, the method allows to directly retrieve the impulse response of the fiber from the beating signal 209 in detection, since the phase of the down-converted signal directly maps the phase of the impulse response of the optical fiber 201.

The resulting beating signal 209 has a bandwidth ($BW_{RF}=N*\delta f$) of 5000×80=400000 Hz=400 kHz and a line spacing or repetition rate of 80 Hz that corresponds to the offset ($\delta f$) of the local oscillatory signal 205. Thus, the frequency compression factor ($\Delta f/\delta f$) is about 12500.

This beating signal 209 is then analysed in an oscilloscope 210 to obtain the impulse response of the optical fiber to the temperature in the fiber under test 201.

Since the spectral compression of the backscattering signal 203 accomplished by the system 200 can be understood as a time domain expansion of the retrieved trace (part of the beating signal carrying relevant information relative to the temperature of optical fiber 201), in essence the same typical trace of a ($\varphi$)OTDR can be read but with very low frequency electronics. In other words, the DFC approach implies a relaxation of the photo-detection bandwidth and the acquisition sampling requirements (here, less than 1 MHz). The optical bandwidth (5 GHz) and the line spacing (1 MHz) of the probe comb allows interrogating fibers with centimetre resolution and a length of 100 m.

Figure 3:
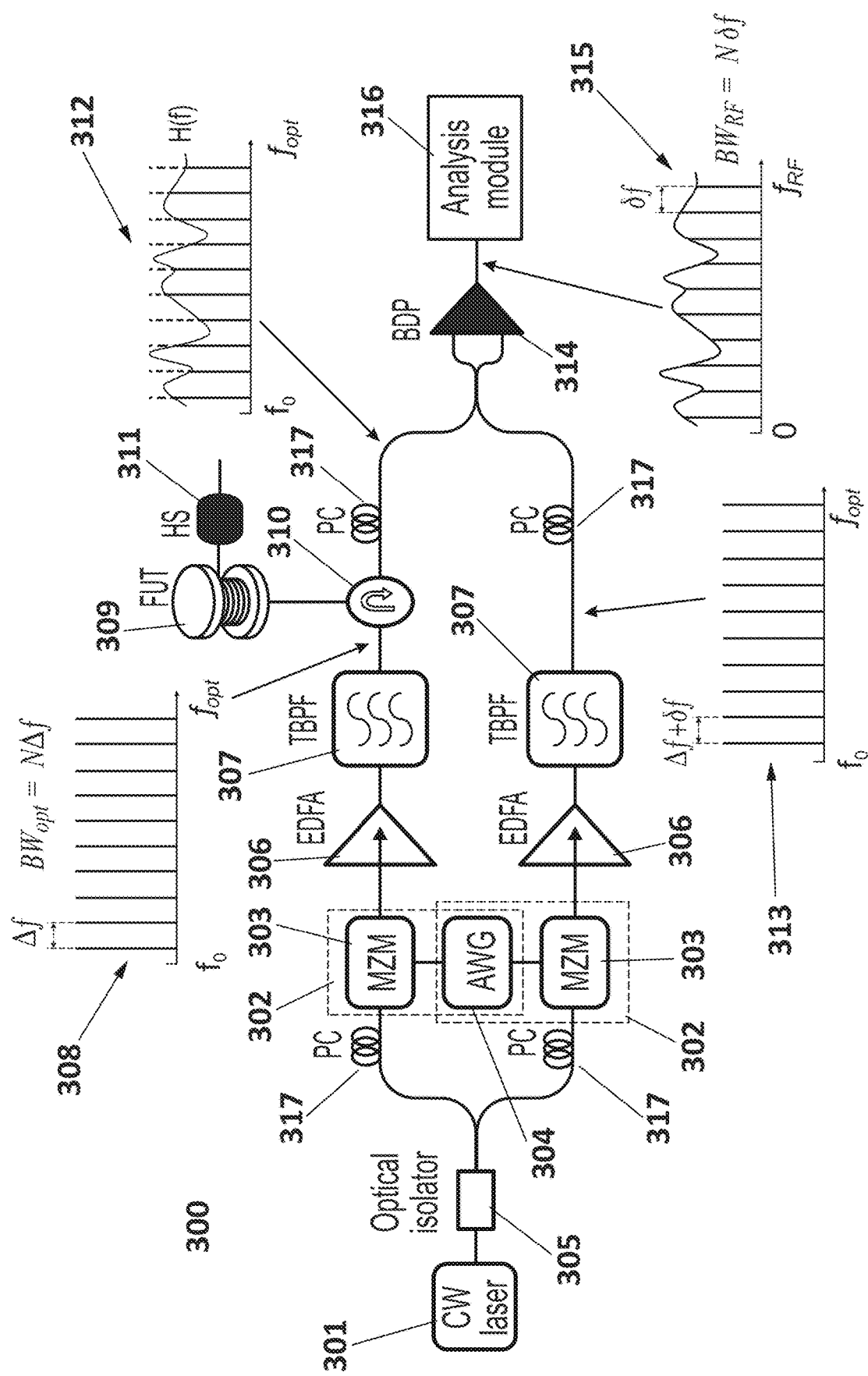
FIG. 3 shows a system for interrogating an optical fiber to measure temperature changes induced by a hot spot in the optical fiber, according to another particular embodiment of the disclosure.

FIG. 3 shows a schematic representation of a system 300 for interrogating an optical fiber 309, according to another particular embodiment of the disclosure. It should be understood that the system 300 of FIG. 3 may include additional components and that some of the components described herein may be removed and/or modified without departing from a scope of the described system 300. Additionally, implementation of the system 300 is not limited to such embodiment.

In such embodiment, the system 300 is configured to measure the temperature changes induced by a hot spot 310 placed in a section close to the end of an optical fiber 309.

In the system 300 shown in FIG. 3, a narrow linewidth continuous wave laser 301 seeds two comb generators 302, each one composed of an intensity Mach Zehnder modulator (MZM) 303 driven by an arbitrary waveform generator (AWG) 304. An optical isolator 305 follows the laser in order to protect it from back reflections that may occur after the isolator 305. The comb generation process involves the computational design of two conjugated symmetric sidebands with respect to the laser frequency "$f_0$", in order to generate a real-valued RF waveform. Two channels of the AWG 304 are employed to drive the MZMs 302, ensuring a proper synchronization between the RF signals. After modulation, the resulting optical frequency signals are amplified using erbium-doped fiber amplifiers (EDFAs) 306. To ensure an unambiguous down-conversion to the RF domain, one sideband of each generated optical frequency comb is suppressed by means of an optical tunable band pass filter (TBPF) 307. These filters 307 also remove part of the amplified spontaneous emission (ASE) introduced by the EDFAs 306.

The AWG signals are designed off-line through an algorithm that involves, in a first stage, the numerical construction on a computer of two frequency combs, whose line separations are, respectively, $\Delta f$ and $\Delta f+\delta f$, being $\delta f \ll \Delta f$. The parameters of these two combs (i.e. total number of lines N, bandwidth $BW_{opt}$ and frequency offset $\delta f$) are subject to a series of constraints described below. In the design of the combs, the same random phase is allocated to each spectral line in order to avoid the formation of high peak-power pulses. Once the individual combs are numerically built in the spectral domain, the corresponding modulation signals are calculated through an inverse Fourier transformation. These signals are then loaded into the AWG 304 and launched into the MZMs 303. After a proper optical filtering, two flat-top frequency combs 308,313 are generated, respectively, in each arm of the system.

The comb used as probe signal 308 is launched into the optical fiber under test 309 by interposition of an optical circulator 310. In this embodiment, the optical fiber 309 is a 50 m of enhanced backscattering optical fiber. A section of 7.6 cm near the end of the fiber is embedded into two 7 W resistances acting as hot spot (HS) 311. The resistances are controlled by a current supply and a temperature gradient is induced into the optical fiber 309. The end of the optical fiber 309 is immersed in an index-matching gel to avoid a high back reflection from that location. After traveling inside the optical fiber 309, the backscattering signal 312 from the optical fiber 309 is beaten with the local oscillator signal 313 (the lines of the backscattering signal 312 beat with all the lines of the local oscillator signal) using a balanced photodetector 314 to generate the beating signal 315.

The beating signal 315 comprises multiple bands in its spectral domain. In order to isolate the intercomb beating frequencies corresponding to the interference of the neighbouring lines of each comb 312,313, the bandwidth of the beating signal 315 (low bandwidth signal) should be smaller than half the line spacing $\Delta f$ of the probe signal 308, i.e., $N\delta f<\Delta f/2$. When this condition is satisfied, the beating signal 315 can be acquired at the baseband (first Nyquist zone, which goes from DC to $\Delta f/2$).

In this particular embodiment, the $BW_{opt}$ of both combs 308,313 is limited by the electrical bandwidth of the electro-optic modulation (that is, by the MZM 303 or the AWG 304). Additionally, the roll-off of the TBPF 307 can lead to a further reduction of the usable bandwidth. The minimum value of $Sf$ is determined by the ratio between the sampling rate of the AWG to the employed memory depth of the analysis module 316. Therefore, $BW_{opt}$ and $\delta f$ are the parameters that become fixed by the performance of the comb generation. Since $\Delta f=BW_{opt}/N$, a downconversion without aliasing implies that $N<\sqrt{BW_{opt}/2\delta f}$. The compression factor achieved by the system of FIG. 3 is given by $CF=(\Delta f/\delta f)$, leading to a temporal expansion of the electrical trace, whose period becomes $CF\times(1/\Delta f)$. This effect also reduces the acoustic sampling to the offset $Sf$. With the above parameters, the maximum sensing range is $1/\Delta f$, while the spatial resolution is ultimately limited by the inverse of the bandwidth $BW_{opt}$ of the probe (flat-top) comb 308.

Then, an analysis module 316, for example, a digital oscilloscope, is used to acquire, digitalize and analyse the down-converted signal 315. The digital oscilloscope is then used to analyse the beating signal 315 to thereby determine the parameter of interest. Polarization controllers (PC) 317 are placed throughout the system 300 to maximize the interference signal.

The acquisition rate at which the data acquisition unit of the oscilloscope 316 gathers measures from the down-converted signal is determined by the offset between the combs of the probe signal 308 and the local oscillator signal 313 ($\delta f=80$ Hz).

The probe signal 308 and the local oscillator signal 313 are two combs composed of 5000 lines, with a line spacing $\Delta f=1$ MHz, which entails an optical bandwidth of 5 GHz. The offset between the two combs is set at 80 Hz. Thus, this system 300 allows interrogating optical fibers up to 100 m with a nominal spatial resolution of ~2 cm. The compression factor of the down-conversion is 12500, so, after detection, the bandwidth is reduced to 400 kHz, while the temporal expansion of the trace is expanded up to 12.5 ms.

A local temperature change is applied to the hot spot 311 of the optical fiber 309 to detect the heating dynamics along the available acquisition time (this acquisition time will be limited by the memory depth of the employed digital oscilloscope 316). Since both combs 308,313 have the same random phase, the beating signal 315 is automatically decoded in the photodetector such that the temporal impulse response can be directly thereby obtained, avoiding the need for applying digital decoding algorithms and hence increasing the computational time.

The signal is detected using the balanced photodetector 314 of 100 MHz bandwidth and subsequently filtered using an electrical 48 MHz low-pass filter (not shown in this figure). The total bandwidth of the photodetected signal comprises the beating between all lines of the dual comb (up to 5 GHz bandwidth). In order to avoid aliasing, the acquisition rate is set to 250 MSps. Thus, the memory depth of the oscilloscope 316 limits the acquisition of traces up to 256 traces at a sampling frequency of 80 Hz, corresponding to a total acquisition time of 3.2 s. The beat notes inside the first Nyquist zone (covering a bandwidth of 400 kHz) are then digitally filtered, maintaining only the positive frequencies. The applied process is equivalent to a multi-heterodyne detection, providing a time-expanded copy of the complex-valued trace.

Figure 4A:
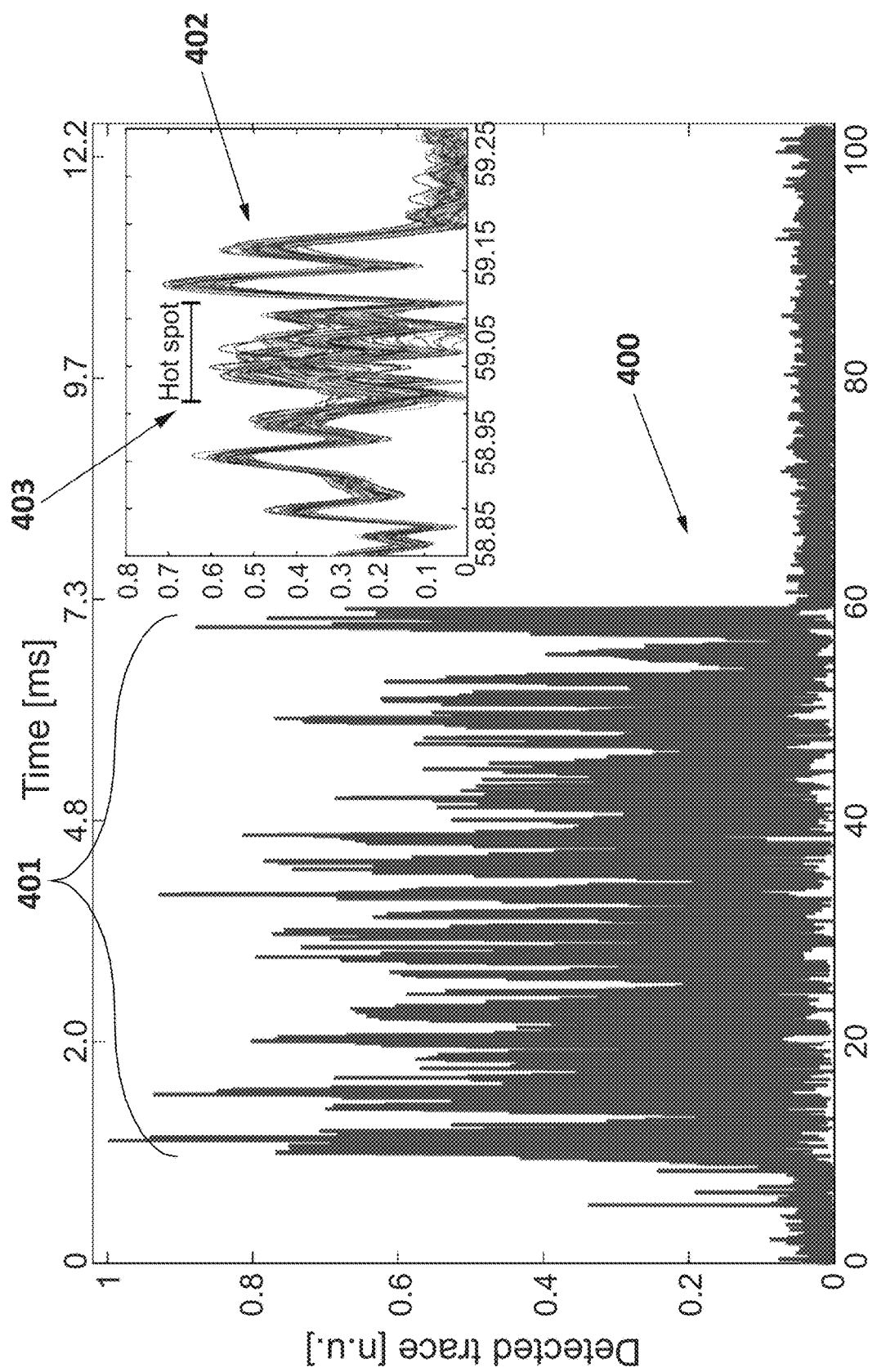
FIG. 4A shows a temporal graph of the magnitude of the beating signal, represented along the fiber length through Time of Flight measurements, including the detected trace, in the system of FIG. 3.

FIG. 4A shows a temporal graph of the magnitude of the beating signal 400, represented along the fiber length through Time of Flight measurements, including the detected trace 401, in the system 300 of FIG. 3. The phase of this trace across the time (fiber distance) provides information on the magnitude to be measured.

The detected trace 401 corresponds to the part of the temporal spectrum of the beating signal 400 that carries information relative to the impulse response of the optical fiber 309 to the temperature that is being measured. Said trace 401 ranges from about 10 meters to 60 meters in the abscissa axis of the graph while the optical fiber under test 311 has a length of 50 meters. The fact that the detected trace 401 appears between the 10-60 meters instead of between the 0-50 meters (the optical fiber under test 309 is 50 meters long with the hot spot 311 being a section of 7.6 cm near the end of the fiber 309, in particular, at the beginning of the 49$^{th}$ meter of the optical fiber) is due to misalignments introduced by the mounting the system 300 of FIG. 3 and should be considered when reading the temporal graph of FIG. 4A. The detected trace 401 has an average SNR of 26 dB. The detection process has been performed over a single polarization axis (i.e., no polarization diversity has been accounted for), and therefore, the trace 401 presents polarization fading, shown as a slowly varying jagged envelope function. Although in a real sensing experiment polarization diversity is critical to avoid those fading regions, for simplicity and clarification purposes, the detection of the trace 401 for this particular embodiment has been simplified. It should be noted the time scale shown on the upper axis. The round-trip time of 100 m of fiber is 1 μs, while the recovered trace 401 with this method is expanded up to 12.5 ms, demonstrating the temporal expansion of the trace 401 by the spectral compression factor (12500 in this case).

The inset 402 of FIG. 4A shows all the traces zoomed around the disturbed region 403 (between the 58.8 m and the 59.3 m, approximately, including the portion of the traces corresponding to the hot spot 311).

Figure 4B:
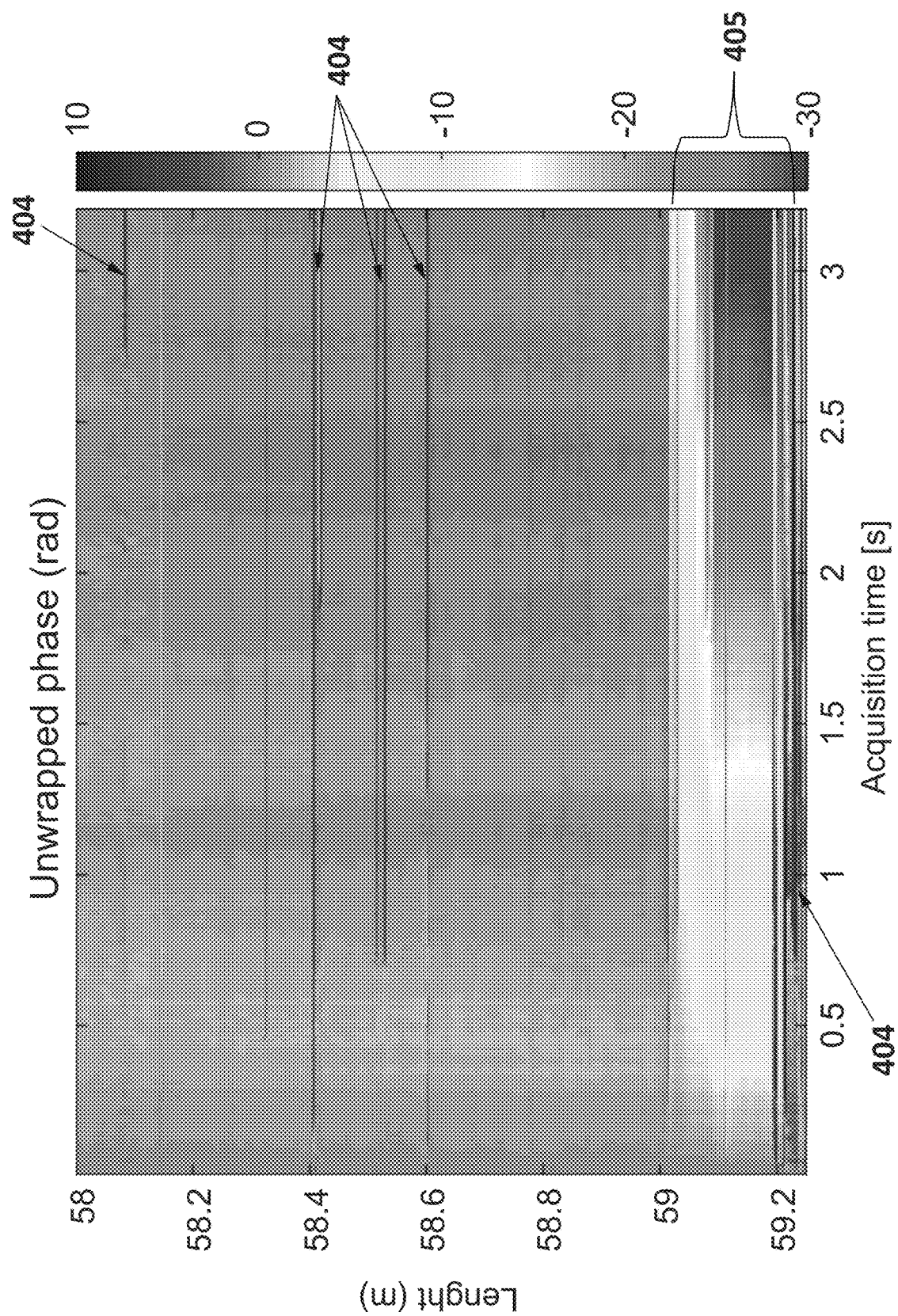
FIG. 4B shows a graph including the unwrapped accumulated phase of the detected traces in the system of FIG. 3.
Figure 4C:
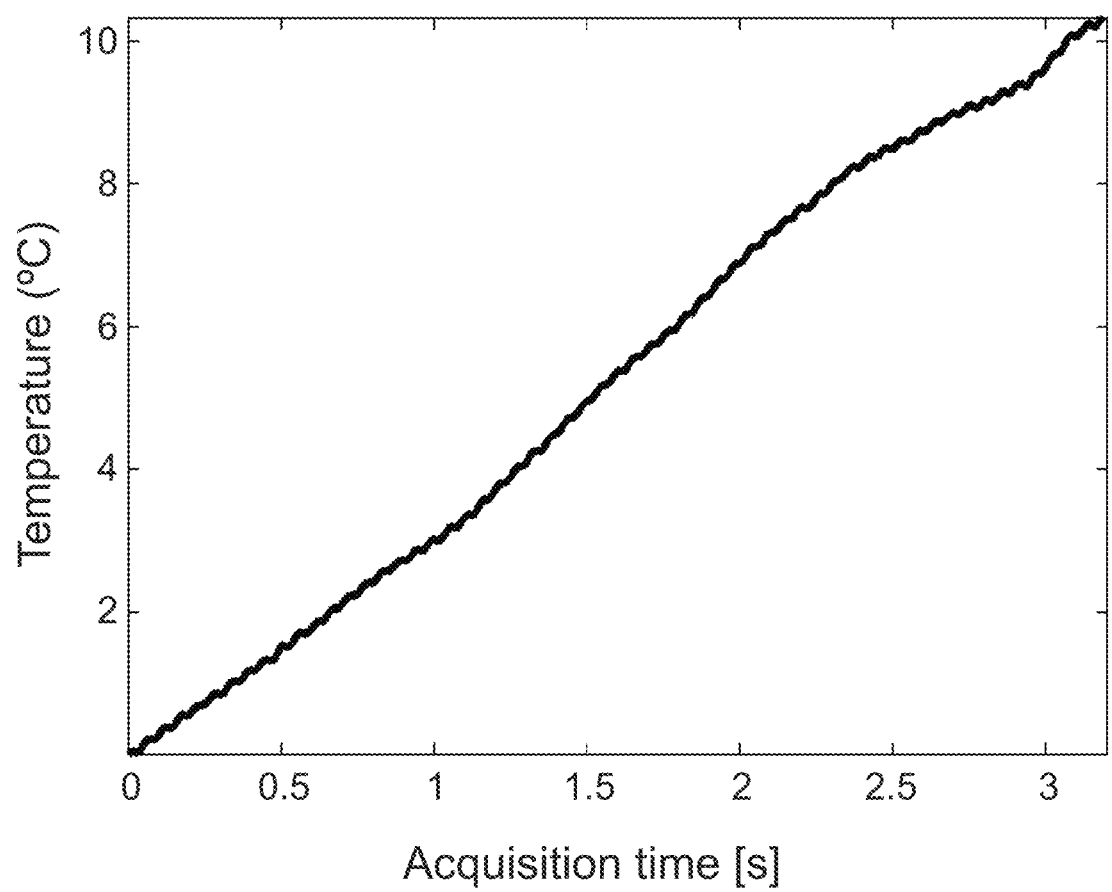
FIG. 4C shows an actual measurement of temperature evolution in the hot-spot located in the interrogated optical fiber in the system of FIG. 3.

FIG. 4B shows a graph including the unwrapped accumulated phase of the detected traces 401 in the system 300 of FIG. 3. This phase provides an indirect measurement of the quantities to be measured (e.g. temperature, strain, etc.). FIG. 4C shows an actual measurement of temperature evolution in the hot spot 311 located in a certain region of the interrogated optical fiber 309, more particularly, the 7.6 cm hot spot 311 is located at the beginning of the 49$^{th}$ meter of the optical fiber 309 (in other words, the hot spot is located between the 49 and 49.76 meters of the optical fiber under test 311).

In particular, FIG. 4B shows the accumulated phase of the detected traces. Hence, it is possible to observe how the phase remains barely unperturbed (excluding typical fading points 404 of φOTDR sensors which are in the range of about 10 rads) up to reaching the hot spot 405 where the accumulated phase ranges between 0 to −30 rads. There, the accumulated phase decreased gradually in time up to −30 rad, approximately. From this phase variation, it is possible to estimate the temperature variation using the following expression $$\frac{\Delta n}{n} = \frac{\lambda_0}{n} \cdot \frac{\Delta\phi}{2\cdot\pi\cdot(2\cdot L)} = -6.92\cdot 10^{-6} \cdot \Delta T$$

where "$\Delta n$" is the refractive index change induced by the perturbation, "n" is the refractive index of the fiber, "$\lambda_0$" is the probe light central wavelength, "$\Delta\phi$" is the phase variation, "L" is the length of the perturbed region, "$\Delta T$" is the temperature change and the proportionality factor in the right-hand side of the equation is the well-known factor between refractive index and temperature in silica fibers. The temperature profile recovered from the measured optical phase is shown in FIG. 4C. This graph shows how the temperature in the hot spot 311 increases from 0 to 10 degrees in a substantially constant way during an acquisition time of about 3.2 seconds.

In this text, the term "comprises" and its derivations (such as "comprising", etc.) should not be understood in an excluding sense, that is, these terms should not be interpreted as excluding the possibility that what is described and defined may include further elements, steps, etc. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system.

The disclosure is obviously not limited to the specific embodiments described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for interrogating an optical fiber, the method including the following steps:
    injecting a probe signal into the optical fiber, the probe signal comprising a first frequency comb at a first repetition rate Δf;
    gathering a backscattering signal from the optical fiber, the backscattering signal comprising the probe signal convolved with an impulse response of the optical fiber in reflection, which is sensitive to at least one parameter being monitored;

beating the backscattering signal with a local oscillator signal to generate a beating signal, the local oscillator signal comprising a second frequency comb at a second repetition rate that is offset from the first repetition rate Δf+δf and being mutually coherent with the first frequency comb, wherein δf is a repetition rate offset between the first and second comb so as to have a increasing separation between adjacent pairs of lines in the two combs; and analysing the beating signal to thereby determine the at least one parameter being monitored by the optical fiber.

2. The method of claim 1, wherein the first frequency comb and the second frequency comb have a same random spectral phase or a different random spectral phase.

3. The method of claim 1 wherein, when the probe signal and the local oscillator signal have a same relative amplitude and spectral phase, analysing the beating signal further includes the following steps:

digitizing the beating signal;

determining the impulse response of the optical fiber in reflection to the at least one parameter being monitored directly from the digitized beating signal; and determining the at least one parameter being monitored by the optical fiber from the impulse response.

4. The method of claim 1, wherein, when at least one of a relative amplitude and a spectral phase of the probe signal and of the local oscillator signal is different, analysing the beating signal further includes the following steps:

digitizing the beating signal;

computing the impulse response of the optical fiber in reflection as a ratio between a Fourier transform of the beating signal and a multiplication of Fourier transforms of the probe signal and a conjugate of the local oscillator signal, wherein the probe signal and the local oscillator signal are previously down-converted to have a frequency spacing corresponding to the offset δf; and determining the at least one parameter being monitored by the optical fiber from the computed impulse response.

5. The method of claim 1, comprising generating, by a first optical frequency comb generator, the probe signal, the first optical frequency comb generator being configured to receive an input signal from a source and to output the first frequency comb.

6. The method of claim 1, comprising generating, by a second optical frequency comb generator, the local oscillator signal, the second optical frequency comb generator being configured to receive the input signal from a source and to output the second frequency comb.

7. The method of claim 1, wherein prior to beating the backscattering signal with the local oscillator signal the method comprises combining the backscattering signal and the local oscillator signal to generate a dual frequency comb signal.

8. A system for interrogating an optical fiber, wherein the system comprises:

the optical fiber that is configured to receive a probe signal, the probe signal comprising a first frequency comb at a first repetition rate Δf and to generate a backscattering signal, the backscattering signal comprising the probe signal convolved with an impulse response of the optical fiber in reflection which is sensitive to at least one parameter being measured;

a photodetector configured to beat the backscattering signal received from the optical fiber with a local oscillator signal, the local oscillator signal comprising a second frequency comb at a second repetition rate that is offset from the first repetition rate, Δf+δf, and that is mutually coherent with the first frequency comb; and a low-bandwidth analysis module configured to determine the at least one parameter being sensed by the optical fiber from the beating signal.

9. The system of claim 8, wherein the first frequency comb and the second frequency comb have a same random spectral phase or a different random spectral phase.

10. The system of claim 8, wherein the low-bandwidth analysis module comprises a data acquisition unit and digitalization unit.

11. The system of claim 8, comprising a dual frequency comb generation system to generate the first frequency comb and the second frequency comb.

12. The system of claim 11, wherein the dual frequency comb generation system comprises:

a first optical frequency comb generator configured to receive an input signal from a source and to output the first frequency comb; and a second optical frequency comb generator configured to receive an input signal from a source and to output the second frequency comb.

13. The system of claim 12, wherein the first optical frequency comb generator is a first Mach-Zehnder modulator driven by a first arbitrary waveform generator and the second optical frequency comb generator is a second Mach-Zehnder modulator driven by the same first arbitrary waveform generator or a second arbitrary waveform generator synchronized with the first arbitrary waveform generator.

14. The system of claim 11, comprising a corresponding amplifier, optically connected at the output of the first optical frequency comb generator and to the output of the second optical frequency comb generator, respectively.

15. The system of claim 14, comprising an optically bandpass filter, optically connected at the output of the amplifiers of the first optical frequency comb generator and of the second optical frequency comb generator, respectively.

* * * * *